(12) United States Patent
Lohe et al.

(10) Patent No.: US 11,757,162 B1
(45) Date of Patent: Sep. 12, 2023

(54) SYSTEMS AND METHODS FOR LOCKING A BATTERY FOR AN ELECTRIC AIRCRAFT

(71) Applicant: BETA AIR, LLC, South Burlington, VT (US)

(72) Inventors: Braedon Lohe, Essex Junction, VT (US); Cullen Jemison, Winooski, VT (US); Andrew Giroux, Georgia, VT (US); Tom Michael Hughes, Bristol, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/704,601

(22) Filed: Mar. 25, 2022

(51) Int. Cl.
| | |
|---|---|
| *H01M 50/574* | (2021.01) |
| *B60L 50/60* | (2019.01) |
| *H01M 10/42* | (2006.01) |
| *H01M 10/48* | (2006.01) |
| *B64D 27/24* | (2006.01) |
| *B60L 58/10* | (2019.01) |

(52) U.S. Cl.
CPC ........... *H01M 50/574* (2021.01); *B60L 50/60* (2019.02); *B60L 58/10* (2019.02); *B64D 27/24* (2013.01); *H01M 10/4257* (2013.01); *H01M 10/482* (2013.01); *B60L 2200/10* (2013.01); *H01M 2010/4271* (2013.01); *H01M 2200/00* (2013.01); *H01M 2220/20* (2013.01)

(58) Field of Classification Search
CPC ........... H01M 50/574; H01M 10/4257; H01M 10/482; B60L 58/10
See application file for complete search history.

(56) References Cited

U.S. PATENT DOCUMENTS

| | | | |
|---|---|---|---|
| 5,089,762 A | 2/1992 | Sloan | |
| 7,339,774 B2 | 3/2008 | Zdziech et al. | |
| 8,213,136 B2 | 7/2012 | Maddali et al. | |
| 9,156,356 B2 | 10/2015 | Rini et al. | |
| 9,365,219 B2 | 6/2016 | Kim et al. | |
| 9,688,150 B2 | 6/2017 | Seong et al. | |
| 10,183,664 B2 | 1/2019 | Yang et al. | |
| 10,381,692 B2 | 8/2019 | Eifert et al. | |
| 11,063,308 B2 | 7/2021 | Baumgardt et al. | |
| 11,094,146 B1 | 8/2021 | Mash | |
| 2010/0159317 A1* | 6/2010 | Taghikhani | H01R 13/641 |
| | | | 429/120 |

(Continued)

FOREIGN PATENT DOCUMENTS

| | | | | |
|---|---|---|---|---|
| CN | 208923257 U | * | 5/2019 | |
| CN | 112467809 A | * | 3/2021 | |
| WO | WO-2013027982 A2 | * | 2/2013 | ............ H01M 10/02 |

OTHER PUBLICATIONS

Aircraft Spruce and Specialty Co, Aircraft Battery Lock, Sep. 23, 2021.

*Primary Examiner* — Jonathan G Jelsma
(74) *Attorney, Agent, or Firm* — CALDWELL INTELLECTUAL PROPERTY LAW (57) ABSTRACT

In an aspect of the present disclosure is a system for locking a battery for an electric aircraft, the system including a battery pack including a high voltage (HV) connection configured to electrically connect to the electric aircraft; and a lock attached to the battery pack and configured to electrically disconnect the battery pack from the electric aircraft when locked, wherein the lock is configured to only be unlocked manually.

17 Claims, 7 Drawing Sheets

(56) References Cited

U.S. PATENT DOCUMENTS

| | | | | |
|---|---|---|---|---|
| 2013/0027183 A1* | 1/2013 | Wu | ............... | B60L 1/003 |
| | | | | 340/5.6 |
| 2014/0062180 A1* | 3/2014 | Demmerle | ............ | B60L 58/00 |
| | | | | 307/9.1 |
| 2019/0020077 A1* | 1/2019 | Campbell | ........... | H01M 10/486 |
| 2021/0143518 A1 | 5/2021 | Zhou et al. | | |
| 2021/0206278 A1 | 7/2021 | Dulle | | |

* cited by examiner

SYSTEMS AND METHODS FOR LOCKING A BATTERY FOR AN ELECTRIC AIRCRAFT

FIELD OF THE INVENTION

The present invention generally relates to the field of electric aircrafts. In particular, the present invention is directed to systems and methods for locking a battery for an electric aircraft.

BACKGROUND

Electric aircrafts offer numerous advantages to transportation. However, the technology of electric aircrafts is still lacking in crucial areas of energy source solutions.

SUMMARY OF THE DISCLOSURE

In an aspect of the present disclosure is a system for locking a battery for an electric aircraft, the system including a battery pack including a high voltage (HV) connection configured to electrically connect to the electric aircraft; and a lock attached to the battery pack and configured to electrically disconnect the battery pack from the electric aircraft when locked, wherein the lock is configured to only be unlocked manually.

In another aspect of the present disclosure is a method for locking a battery for an electric aircraft, the method including: receiving, at a controller communicatively connected to a sensor configured to detect a critical event of a battery pack, battery datum from the sensor; analyzing, by the controller, the battery datum to determine whether the critical event has occurred; and locking, by the controller, a lock attached to the battery pack when the controller determines the critical event has occurred, wherein the lock is configured to electrically disconnect the battery pack from the electric aircraft when locked, wherein the lock is configured to only be unlocked manually.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for locking a battery for an electric vehicle. In an embodiment, a system for locking a battery for an electric vehicle may include a battery pack with a high voltage (H) connection configured to electrically connect to electric vehicle. A lock may be attached to battery pack and configured to electrically disconnect battery pack from electric vehicle when locked, wherein lock is configured to only be unlocked manually. Lock may be configured to lock when a critical event is detected, such as overvoltage, undervoltage, overheating, high humidity, and other conditions that may harm battery pack and/or electric vehicle. Aspects of the present disclosure can be used to protect battery pack, electric vehicle, and electrical subsystems of the electric vehicle connected to the battery pack. Exemplary embodiments illustrating aspects of the present disclosure are described below in the context of several specific examples.

Figure 1:
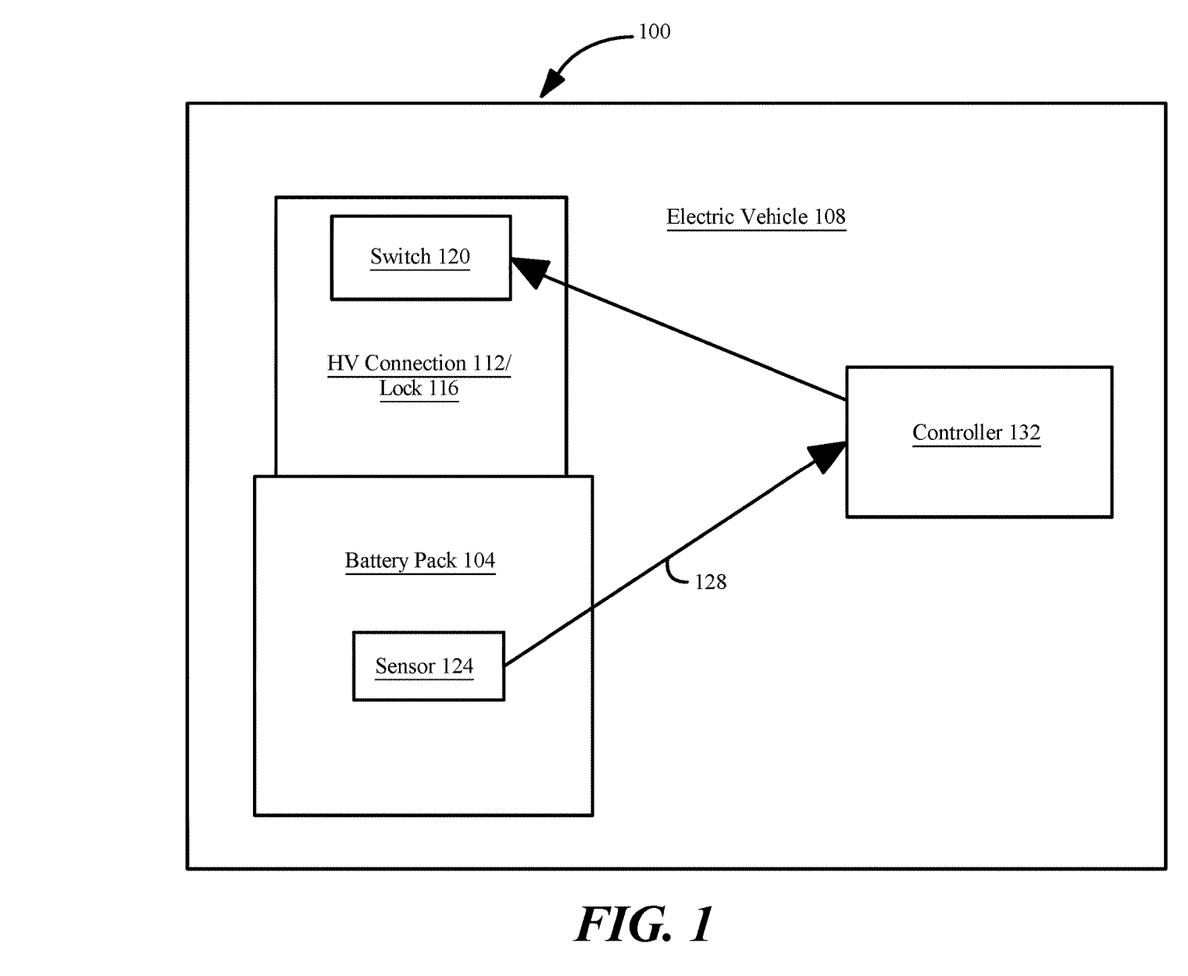
FIG. 1 is a block diagram illustrating an embodiment of a system for locking a battery for an electric aircraft according to the present disclosure.

Now referring to FIG. 1, a system for locking a battery for an electric vehicle is illustrated. System 100 includes a battery pack 104. In one or more embodiments, battery pack 104 may include a plurality of battery modules. In one or more embodiments, each battery module may include a battery cell. Battery pack 104 may include a plurality of battery modules. In one or more embodiments, battery pack 104 may include a battery module, as discussed below, which may be configured to power an electric vehicle 108 and/or electrical subsystems of the electric vehicle 108. Electric vehicle 108 may be an electric automobile, an electric aircraft including an electrical vertical takeoff and landing (eVTOL) aircraft, a helicopter, a commercial aircraft, an unmanned aerial vehicle, a rotorcraft, and the like. Battery pack 104 includes a high voltage (HV) 112 connection configured to electrically connect to electric vehicle 108. As used in this disclosure, a "high voltage connection" is an electrical and/or physical communication between a battery pack 104 and an electric vehicle 108 that powers the electric vehicle 108 and/or the electric vehicle 108 subsystems for operation.

With continued reference to FIG. 1, system 100 includes a lock 116 attached to battery pack 104 and configured to electrically disconnect the battery pack 104 from electric vehicle 108 when locked. As used in this disclosure, a "lock" is a component that electrically disconnects a high voltage connection, where disconnection may be performed using a physical disconnection or interruption. Lock 116 may be configured to open and close an electrical circuit connecting battery pack 104 to electric vehicle 108. In some embodiments, lock 116 may be configured to open and close an electrical circuit connecting battery pack 104 to HV connection 112. In some embodiments, lock 116 may be configured to cause HV connection 112 to disconnect battery pack 104 from electric vehicle 108. Lock 116 may be attached to HV connection 112. Lock 116 may be configured to electrically isolate battery pack 104 from electric vehicle 108 and electrical subsystems of the electric vehicle 108 when locked. "Electrical isolation", for the purposes of this disclosure, refers to a first system's separation of components carrying electrical signals or electrical energy from a second system's components. Lock 116 is configured to only be unlocked manually. Once unlocked, lock 116 may be electrically connected to electric vehicle 108, electrical subsystems of the electric vehicle 108, and/or any other circuitry. Lock 116 may include a switch 120 such as a an electrically controlled switch, a DC/DC switch, a mechanical switch, a semiconductor switch, an isolator, a contactor, and/or a relay; a fuse; a circuit breaker; or a combination thereof, which are in circuitry that electrically connects battery pack 104 to electric vehicle 108 and/or electrical subsystems of the electric vehicle 108. When switch 120 is open, fuse is blown, and/or circuit breaker is triggered, the circuitry electrically connecting battery pack 104 to electric vehicle 108 and/or electrical subsystems of the electric vehicle 108 is open, thus electrically isolating the battery pack 104. An overvoltage, such as a voltage spike or power surge, may trip circuit breaker in lock 116, causing battery pack 104 to be electrically isolated from electric vehicle 108 and requiring the circuit breaker to be manually reset, thus manually unlocking lock 116, before battery pack 104 can act as a power source. Similarly, an overvoltage may blow fuse in lock 116, causing battery pack 104 to be electrically isolated and requiring manual replacement of the fuse, thus manually unlocking of lock 116, before the battery pack 104 can provide power again. Lock 116 may be electrically actuated. As used in this disclosure, "electrically actuated" means a lock may be electrically locked but cannot be electrically unlocked. Lock 116 may be configured to automatically lock when a critical event occurs. For the purposes of this disclosure, a "critical event" is a failure and/or critical operating condition of a battery pack 104 and/or components thereof that may be harmful to a battery pack 104 and/or corresponding electric vehicle 108. In one or more embodiments, critical event may include high shock/drop, overtemperature, undervoltage, overvoltage including a power surge, high moisture, contactor welding, and the like. Critical event may be implemented as critical event element disclosed in U.S. patent application Ser. No. 17/529,447 entitled "MODULE MONITOR UNIT FOR AN ELECTRIC AIRCRAFT BATTERY PACK AND METHODS OF USE", the entirety of which in incorporated herein by reference.

Still referring to FIG. 1, system 100 may include a sensor 124 communicatively connected to lock 116. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. Sensor 124 may be configured to detect condition parameter of battery pack 104 and generate a battery datum 128 based on the condition parameter. As used in this disclosure, a "sensor" is a device that is configured to detect an input and/or a phenomenon and transmit information and/or datum related to the detection; sensor 124 may include an electronic sensor, which transmits information and/or datum electronically. As used in this disclosure, "battery datum" is an element of data encoding one or more condition parameters in an electrical signal such as a binary, analog, pulse width modulated, or other signal. For example, and without limitation, sensor 124 may transduce a detected phenomenon and/or characteristic of battery pack 104, such as, and without limitation, temperature, voltage, current, pressure, temperature, moisture level, and the like, into a sensed signal. A sensor may include one or more sensors and may generate a sensor output signal, which transmits information and/or datum related to a sensor detection. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal to improve the signal, for instance by improving transmission, storage efficiency, or signal to noise ratio. For example, and without limitation, sensor may detect and/or measure a condition parameter, such as a temperature, of battery module. In one or more embodiments, a condition parameter of battery pack 104 may include a condition parameter of a battery module and/or battery cell.

With continued reference to FIG. 1, sensor 124 may include a plurality of sensors. Sensor 124 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, bolometers, and the like. Sensor 124 may be a contact or a non-contact sensor. For example, and without limitation, sensor 124 may be connected to battery module and/or battery cell of battery pack 104. In other embodiments, sensor 124 may be remote to battery pack 104. Sensor 124 may include a pressure sensor, a real time clock (RTC) sensor that is used to track the current time and date, a humidity sensor, an accelerometer/IMU, or other sensor. Sensor 124 may include a sensor suite as discussed below. In some embodiments, system 100 may include a module monitor unit (MMU) and/or a pack monitoring unit (PMU) that includes and/or is communicatively connected to sensor 124 and is configured to receive battery datum 128 from sensor 124. MMU and/or PMU may be communicatively connected to lock 116 and may be configured to transmit a signal to lock 116 to lock. Additional disclosure related to a module monitor unit can be found in U.S. patent application Ser. No. 17/529,447 entitled "MODULE MONITOR UNIT FOR AN ELECTRIC AIRCRAFT BATTERY PACK AND METHODS OF USE", which already is incorporated herein by reference. Additional disclosure related to a pack monitoring unit can be found in U.S. patent application Ser. No. 17/529,583 entitled "PACK MONITORING UNIT FOR AN ELECTRIC AIRCRAFT BATTERY PACK AND METHODS OF USE FOR BATTERY MANAGEMENT", the entirety of which is incorporated herein by reference.

Still referring to FIG. 1, sensor 124 may be configured to detect critical event. Lock 116 may be inoperable when locked, requiring lock 116 to be unlocked for battery pack 104 to be used as a power source. System 100 may include a controller 132 communicatively connected to sensor 124 and lock 116. Controller 132 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 132 may include a single computing device operating independently, or may include two or more computing device operating in concert, in parallel, sequentially or the like; two or more computing devices may be included together in a single computing device or in two or more computing devices. Controller 132 may interface or communicate with one or more additional devices as described below in further detail via a network interface device. Network interface device may be utilized for connecting controller 132 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 132 may include but is not limited to, for example, a computing device or cluster of computing devices in a first location and a second computing device or cluster of computing devices in a second location. Controller 132 may include one or more computing devices dedicated to data storage, security, distribution of traffic for load balancing, and the like. Controller 132 may distribute one or more computing tasks as described below across a plurality of computing devices of computing device, which may operate in parallel, in series, redundantly, or in any other manner used for distribution of tasks or memory between computing devices. Controller 132 may be implemented using a "shared nothing" architecture in which data is cached at the worker, in an embodiment, this may enable scalability of system 100 and/or computing device.

With continued reference to FIG. 1, controller 132 may be designed and/or configured to perform any method, method step, or sequence of method steps in any embodiment described in this disclosure, in any order and with any degree of repetition. For instance, controller 132 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 132 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, controller 132 may be configured to receive battery datum 128 from sensor 124. For example, and without limitation, controller 132 may use battery datum 128 from sensor 124 to identify a temperature of 95° F. for a battery cell. If the predetermined temperature threshold is, for example, 75° F. to 90° F., then the determined operating condition is outside of the predetermined temperature threshold, such as exceeding the upper threshold of 90° F., and a critical event is determined by controller 132. As used in this disclosure, a "predetermined threshold" is a limit and/or range of an acceptable quantitative value or representation related to a normal operating condition and/or state of a battery pack 104 and/or components thereof. In one or more embodiments, an operating condition outside of a threshold is a critical operating condition, which triggers a critical event. An operating condition within the threshold is a normal operating condition, which indicates that a battery pack 104 is working properly and no critical event is determined. For example, and without limitation, if an operating condition of temperature exceeds a predetermined temperature threshold of a battery pack, then the battery pack is considered to be operating at a critical operating condition and may be at risk of overheating and experiencing a catastrophic failure.

In some embodiments, and with continued reference to FIG. 1, controller 132 may be configured to transmit a signal to open or close switch 120. Lock 116 may be locked by opening switch 120, which electrically isolates battery pack 104 from electric vehicle 108 and/or electrical subsystems of the electric vehicle 108. Switch 120 may only be closed manually, which unlocks lock 116. Controller 132 may be configured to analyze battery datum 128 it receives from sensor 124. Controller 132 may be configured to automatically transmit a signal to open switch 120, thus locking lock 116, when it receives battery datum 128 from sensor 124 that identifies a critical event. In some embodiments, system 100 may include an actuator communicatively connected to controller 132 and configured to manually open a mechanical switch 120. Controller 132 may be configured to log any identified critical events, such as a lockout flag, which may be saved across reboots. A "lockout flag" may include an indicator alerting a user of a critical event and subsequent locking of lock 116 and, thus, termination of power supplied by battery pack 104. In one or more embodiments, a lockout flag may be saved in memory component of controller 132 so that, despite rebooting battery pack 104 or complete loss of power of battery pack 104, an alert regarding the critical event and resulting locking of battery pack 104 remains. In one or more embodiments, an alert and/or lockout flag may be transmitted to a user device for viewing. For example, and without limitation, an alert may be shown on a mobile device, a laptop, a tablet, a display of an electric aircraft user interface, or the like. In one or more embodiments, lockout flag cannot be removed until a critical event is no longer determined by controller 132. For, example, controller 132 may be continuously updating an operating condition and determining if operating condition is outside of a predetermined threshold. In one or more embodiments, lockout flag may include an alert on a graphic user interface of, for example, a remote computing device, such as a mobile device, tablet, laptop, desktop and the like. In other embodiments, lockout flag may be indicated to a user via an illuminated LED that is remote or locally located on battery pack 104.

With continued reference to FIG. 1, in some embodiments, once lock 116 is locked, it remains locked until a user manually unlocks the lock 116. Unlocking lock 116 may be simply manually closing switch 120. In some embodiments, controller 132 may communicatively connected to a user input, such as a card reader, keypad, fingerprint scanner, and/or the like, that is configured to receive input from a user. Controller 132 may be configured to distinguish acceptable user inputs from unacceptable user inputs, and close switch 120 when an acceptable input is received from user input. For example, certain users may be given clearance and their credentials may be pre-programmed in controller 132 as acceptable user inputs. In some embodiments, lock 116 includes an indicator that is visible by the user when the lock 116 is locked, thus allowing the user to easily identify whether lock 116 of battery pack 104 is locked. In some embodiments, sensor 124 may include a sensor that is configured to determine whether maintenance is being performed on battery pack 104. Lock 116 may automatically unlock when controller 132 receives battery datum 128 from sensor 124 indicating that maintenance is being performed on battery pack 104.

Figure 2:
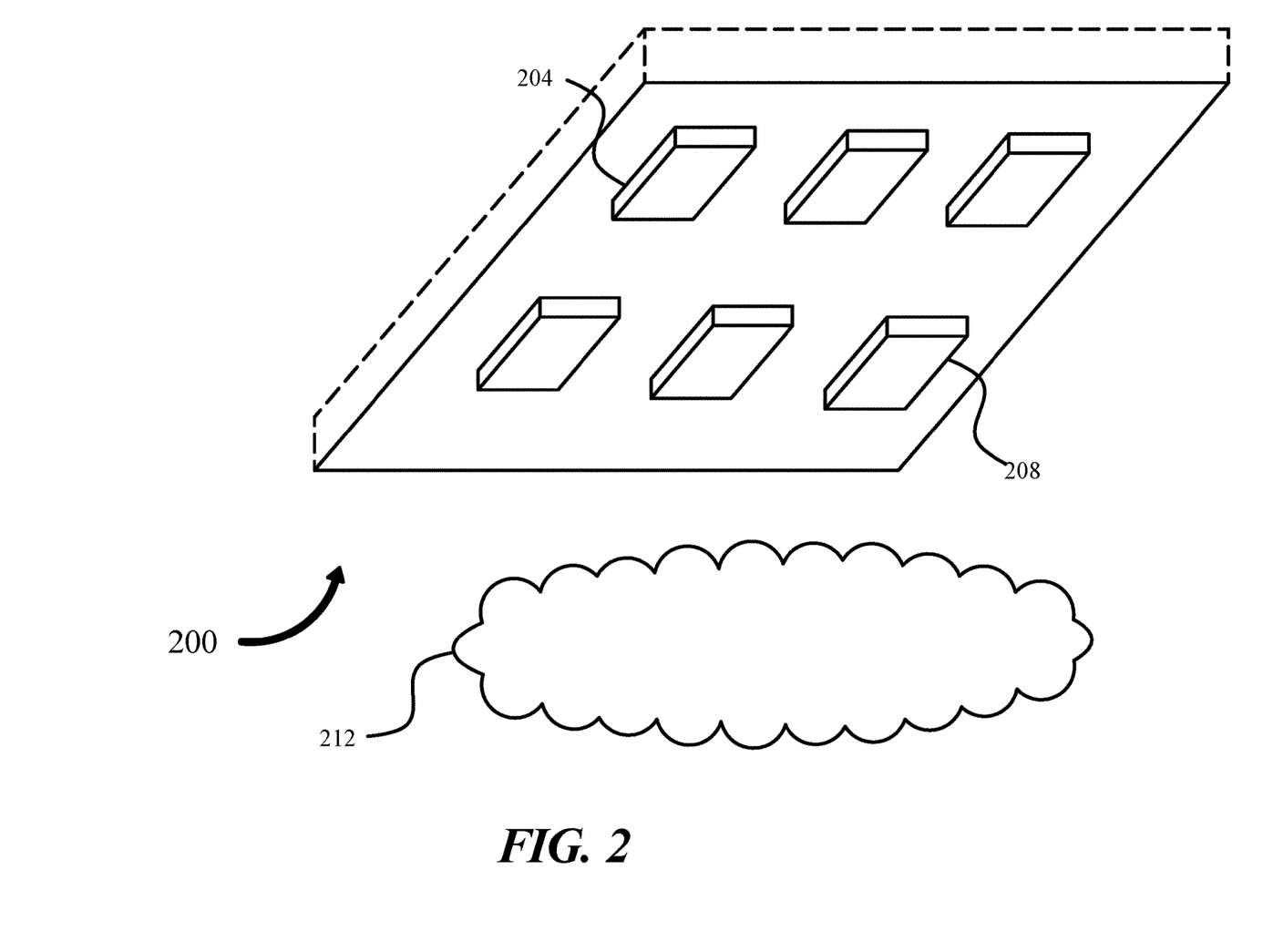
FIG. 2 is an illustration of an exemplary embodiment of a sensor suite in partial cut-off view in one or more aspects of the present disclosure.

Referring now to FIG. 2, an embodiment of sensor suite 200 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 104 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of system 100 and/or user to detect phenomenon is maintained and in a non-limiting example, a user alter aircraft usage pursuant to sensor readings.

Sensor suite 200 may be suitable for use as sensor 124 as disclosed with reference to FIG. 1 hereinabove. Sensor suite 200 includes a moisture sensor 204. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 204 may be psychrometer. Moisture sensor 204 may be a hygrometer. Moisture sensor 204 may be configured to act as or include a humidistat. A "humidistat", for the purposes of this disclosure, is a humidity-triggered switch, often used to control another electronic device. Moisture sensor 204 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 2, sensor suite 200 may include electrical sensors 208. Electrical sensors 208 may be configured to measure voltage across a component, electrical current through a component, and resistance of a component. Electrical sensors 208 may include separate sensors to measure each of the previously disclosed electrical characteristics such as voltmeter, ammeter, and ohmmeter, respectively.

Alternatively or additionally, and with continued reference to FIG. 2, sensor suite 200 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 200 and/or a control circuit incorporated therein and/or communicatively connected thereto may be configured to adjust charge to one or more battery cells as a function of a charge level and/or a detected parameter. For instance, and without limitation, sensor suite 200 may be configured to determine that a charge level of a battery cell is high based on a detected voltage level of that battery cell or portion of the battery pack. Sensor suite 200 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 200 may include digital sensors, analog sensors, or a combination thereof. Sensor suite 200 may include digital-to-analog converters (DAC), analog-to-digital converters (ADC, A/D, A-to-D), a combination thereof, or other signal conditioning components used in transmission of a first plurality of battery pack data to a destination over wireless or wired connection.

With continued reference to FIG. 2, sensor suite 200 may include thermocouples, thermistors, thermometers, passive infrared sensors, resistance temperature sensors (RTDs), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 200, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 2, sensor suite 200 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts 212 of cell failure may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 200, may be configured to detect combustible, flammable, toxic, oxygen depleted, a combination thereof, or another type of gas alone or in combination. The gas sensor that may be present in sensor suite 200 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 200 may include sensors that are configured to detect non-gaseous byproducts 212 of cell failure including, in non-limiting examples, liquid chemical leaks including aqueous alkaline solution, ionomer, molten phosphoric acid, liquid electrolytes with redox shuttle and ionomer, and salt water, among others. Sensor suite 200 may include sensors that are configured to detect non-gaseous byproducts 212 of cell failure including, in non-limiting examples, electrical anomalies as detected by any of the previous disclosed sensors or components.

With continued reference to FIG. 2, sensor suite 200 may be configured to detect events where voltage nears an upper voltage threshold or lower voltage threshold. The upper voltage threshold may be stored in a memory component of controller 132 for comparison with an instant measurement taken by any combination of sensors present within sensor suite 200. The upper voltage threshold may be calculated and calibrated based on factors relating to battery cell health, maintenance history, location within battery pack, designed application, and type, among others. Sensor suite 200 may measure voltage at an instant, over a period of time, or periodically. Sensor suite 200 may be configured to operate at any of these detection modes, switch between modes, or simultaneous measure in more than one mode. In one or more exemplary embodiments, controller 132 may determine, using sensor suite 200, a critical event where voltage nears the lower voltage threshold. The lower voltage threshold may indicate power loss to or from an individual battery cell or portion of the battery pack. Controller 132 may determine through sensor suite 200 critical events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

In one or more embodiments, sensor suite 200 may include an inertial measurement unit (IMU). In one or more embodiments, an IMU may be configured to detect a change in specific force of a body. An IMU may include an accelerometer, a gyro sensor, a magnetometer, an E-compass, a G-sensor, a geomagnetic sensor, and the like. An IMU may be configured to obtain measurement datum. Controller 132 may determine a critical event by if, for example, an accelerometer of sensor suite 200 detects a force experienced by battery pack 104 that exceeds a predetermined threshold.

Figure 3A:
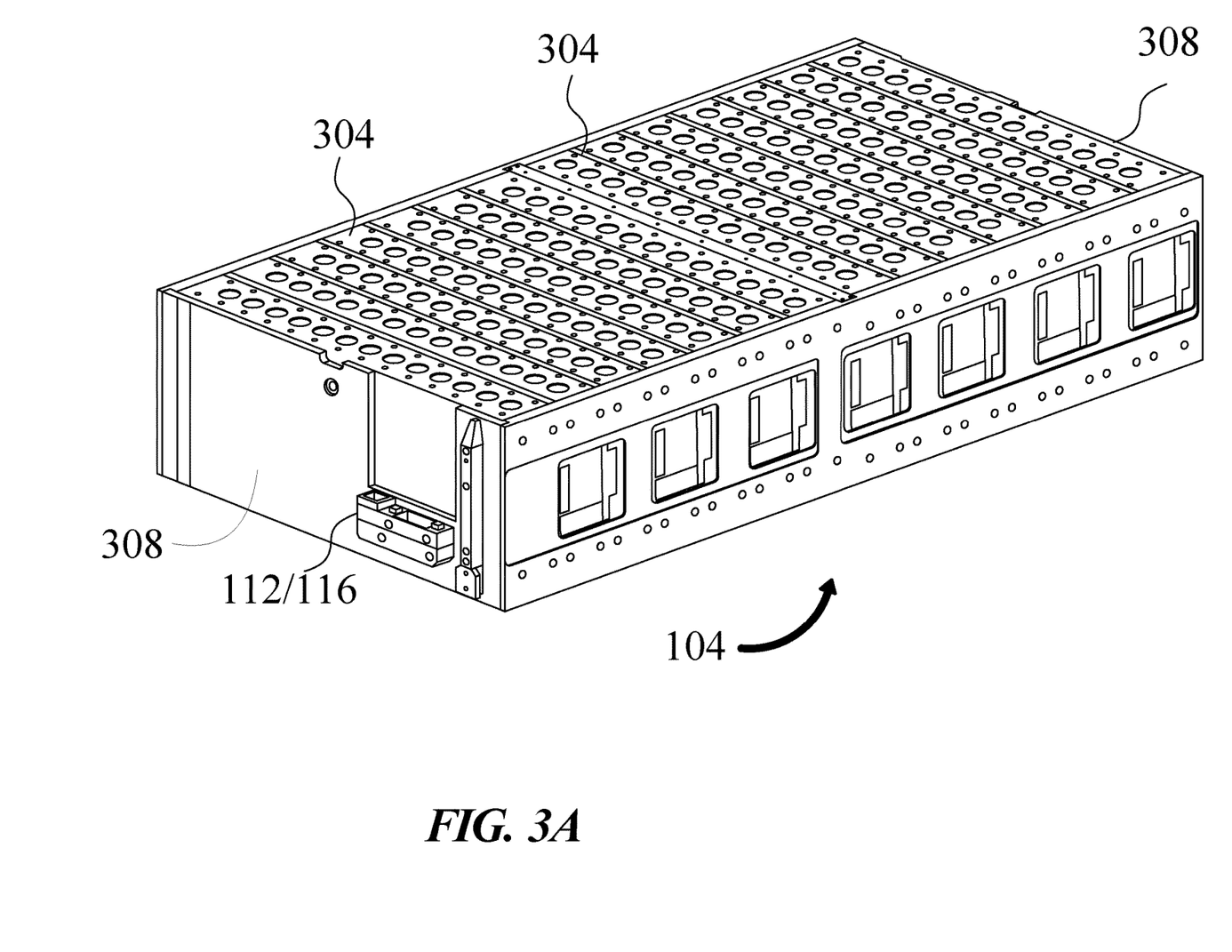
FIGS. 3A and 3B are illustrations of exemplary embodiments of battery pack configured for use in an electric vehicle in isometric view in accordance with one or more aspects of the present disclosure.
Figure 3B:
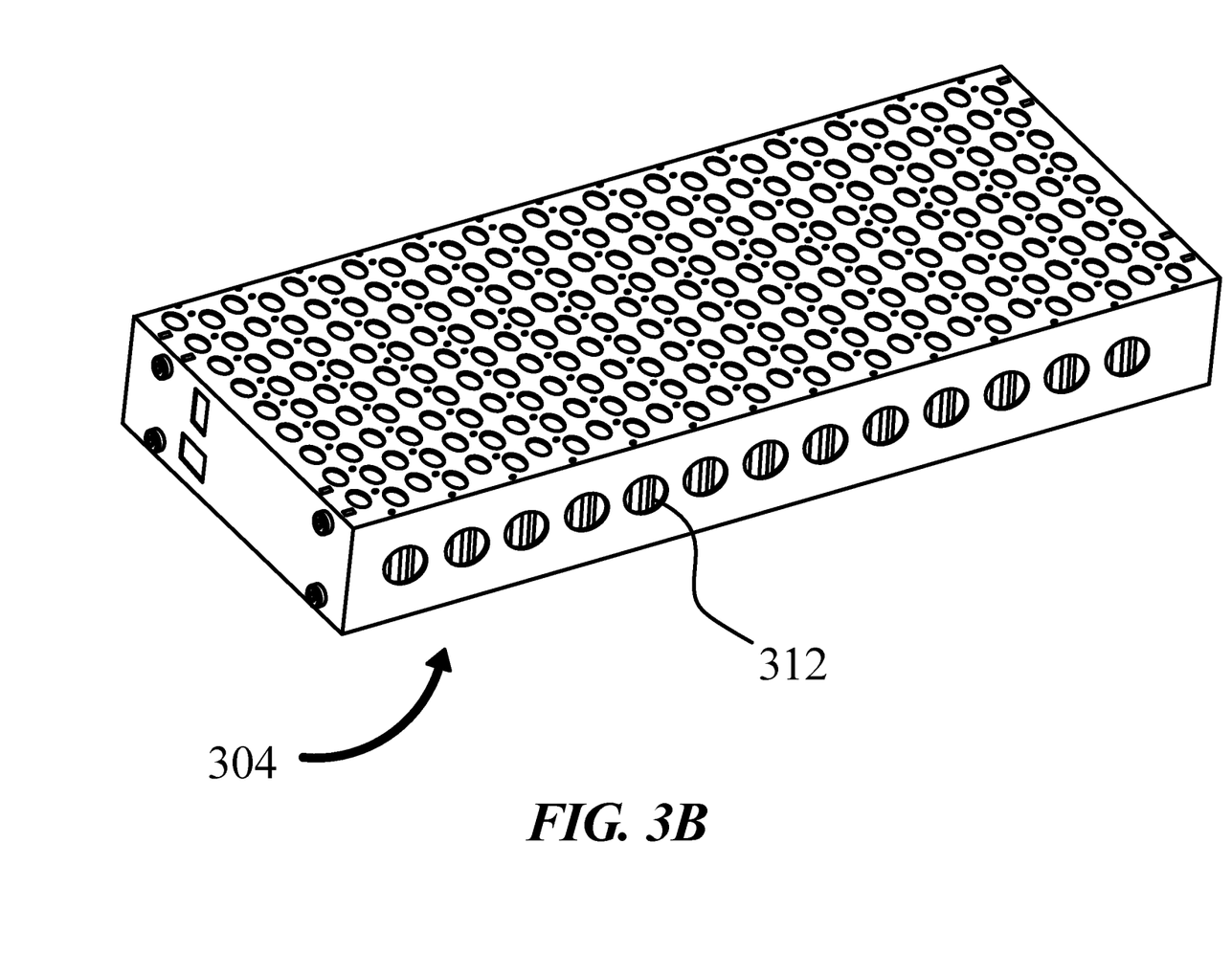

Now referring to FIGS. 3A and 3B, an exemplary embodiment of an electric vehicle battery pack is illustrated. Battery pack 104 is a power source that may be configured to store electrical energy in the form of a plurality of battery modules, which themselves include of a plurality of electrochemical cells. These cells may utilize electrochemical cells, galvanic cells, electrolytic cells, fuel cells, flow cells, pouch cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term "battery" is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term "wired", but one of ordinary skill in the art would appreciate that this term is synonymous with "electrically connected", and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, and without limitation, battery pack 104 include 196 battery cells in series and 18 battery cells in parallel. This is, as someone of ordinary skill in the art would appreciate, is only an example and battery pack 104 may be configured to have a near limitless arrangement of battery cell configurations. Battery pack 104 may be designed to the Federal Aviation Administration (FAA)'s Design Assurance Level A (DAL-A), using redundant DAL-B subsystems.

With continued reference to FIGS. 3A and 3B, battery pack 104 may include a plurality of battery modules 304. Battery modules 304 may be wired together in series and in parallel. Battery pack 104 may include a center sheet which may include a thin barrier. The barrier may include a fuse connecting battery modules on either side of the center sheet. The fuse may be disposed in or on the center sheet and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may include a thermal fuse, mechanical fuse, blade fuse, expulsion fuse, spark gap surge arrestor, varistor, or a combination thereof.

Battery pack 104 may also include a side wall includes a laminate of a plurality of layers configured to thermally insulate the plurality of battery modules from external components of battery pack 104. The side wall layers may include materials which possess characteristics suitable for thermal insulation as described in the entirety of this disclosure like fiberglass, air, iron fibers, polystyrene foam, and thin plastic films, to name a few. The side wall may additionally or alternatively electrically insulate the plurality of battery modules from external components of battery pack 104 and the layers of which may include polyvinyl chloride (PVC), glass, asbestos, rigid laminate, varnish, resin, paper, Teflon, rubber, and mechanical lamina. The center sheet may be mechanically coupled to the side wall in any manner described in the entirety of this disclosure or otherwise undisclosed methods, alone or in combination. The side wall may include a feature for alignment and coupling to the center sheet. This feature may include a cutout, slots, holes, bosses, ridges, channels, and/or other undisclosed mechanical features, alone or in combination.

With continued reference to FIGS. 3A and 3B, battery pack 104 may also include an end panel 308 including a plurality of electrical connectors and further configured to fix battery pack 104 in alignment with at least the side wall. End panel 308 may include a plurality of electrical connectors of a first gender configured to electrically and mechanically connect to electrical connectors of a second gender. The end panel may be configured to convey electrical energy from battery cells to at least a portion of an eVTOL aircraft, for example, using HV connection 112. Electrical energy may be configured to power at least a portion of an eVTOL aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which the end panel includes may be configured for power and communication purposes. A first end of the end panel may be configured to mechanically couple to a first end of a first side wall by a snap attachment mechanism, similar to end cap and side panel configuration utilized in the battery module. To reiterate, a protrusion disposed in or on the end panel may be captured, at least in part, by a receptacle disposed in or on the side wall. A second end of end the panel may be mechanically coupled to a second end of a second side wall in a similar or the same mechanism.

With continued reference to FIGS. 3A and 3B, sensor suite 200 may be disposed in or on a portion of battery pack 104 near battery modules or battery cells. In one or more embodiments, lock 116 may be configured to communicate with an electric aircraft, such as a flight controller of electric vehicle 108, using a controller area network (CAN). In one or more embodiments, a controller area network may include a bus. Bus may include an electrical bus. Bus may refer to power busses, audio busses, video busses, computing address busses, and/or data busses. Bus may be additionally or alternatively responsible for conveying electrical signals generated by any number of components within battery pack 104 to any destination on or offboard an electric vehicle.

Outputs from sensors or any other component present within system may be analog or digital. Onboard or remotely located processors can convert those output signals from sensor suite to a usable form by the destination of those signals. The usable form of output signals from sensors, through processor may be either digital, analog, a combination thereof or an otherwise unstated form. Processing may be configured to trim, offset, or otherwise compensate the outputs of sensor suite. Based on sensor output, the processor can determine the output to send to downstream component. Processor can include signal amplification, operational amplifier (Op-Amp), filter, digital/analog conversion, linearization circuit, current-voltage change circuits, resistance change circuits, an error compensator circuit, a combination thereof or otherwise undisclosed components.

With continued reference to FIGS. 3A and 3B, any of the disclosed components or systems, namely battery pack 104, lock 116, and/or battery cell 312 may incorporate provisions to dissipate heat energy present due to electrical resistance in integral circuit. Battery pack 104 includes one or more battery element modules wired in series and/or parallel. The presence of a voltage difference and associated amperage inevitably will increase heat energy present in and around battery pack 104 as a whole. The presence of heat energy in a power system is potentially dangerous by introducing energy possibly sufficient to damage mechanical, electrical, and/or other systems present in at least a portion of an electric aircraft. Battery pack 104 may include mechanical design elements, one of ordinary skill in the art, may thermodynamically dissipate heat energy away from battery pack 104. The mechanical design may include, but is not limited to, slots, fins, heat sinks, perforations, a combination thereof, or another undisclosed element.

Heat dissipation may include material selection beneficial to move heat energy in a suitable manner for operation of battery pack 104. Certain materials with specific atomic structures and therefore specific elemental or alloyed properties and characteristics may be selected in construction of battery pack 104 to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. The battery pack 104 may include similar or identical features and materials ascribed to battery pack 104 in order to manage the heat energy produced by these systems and components.

According to embodiments, the circuitry disposed within or on battery pack 104 may be shielded from electromagnetic interference. The battery elements and associated circuitry may be shielded by material such as mylar, aluminum, copper a combination thereof, or another suitable material. The battery pack 104 and associated circuitry may include one or more of the aforementioned materials in their inherent construction or additionally added after manufacture for the express purpose of shielding a vulnerable component. The battery pack 104 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies.

Figure 4:
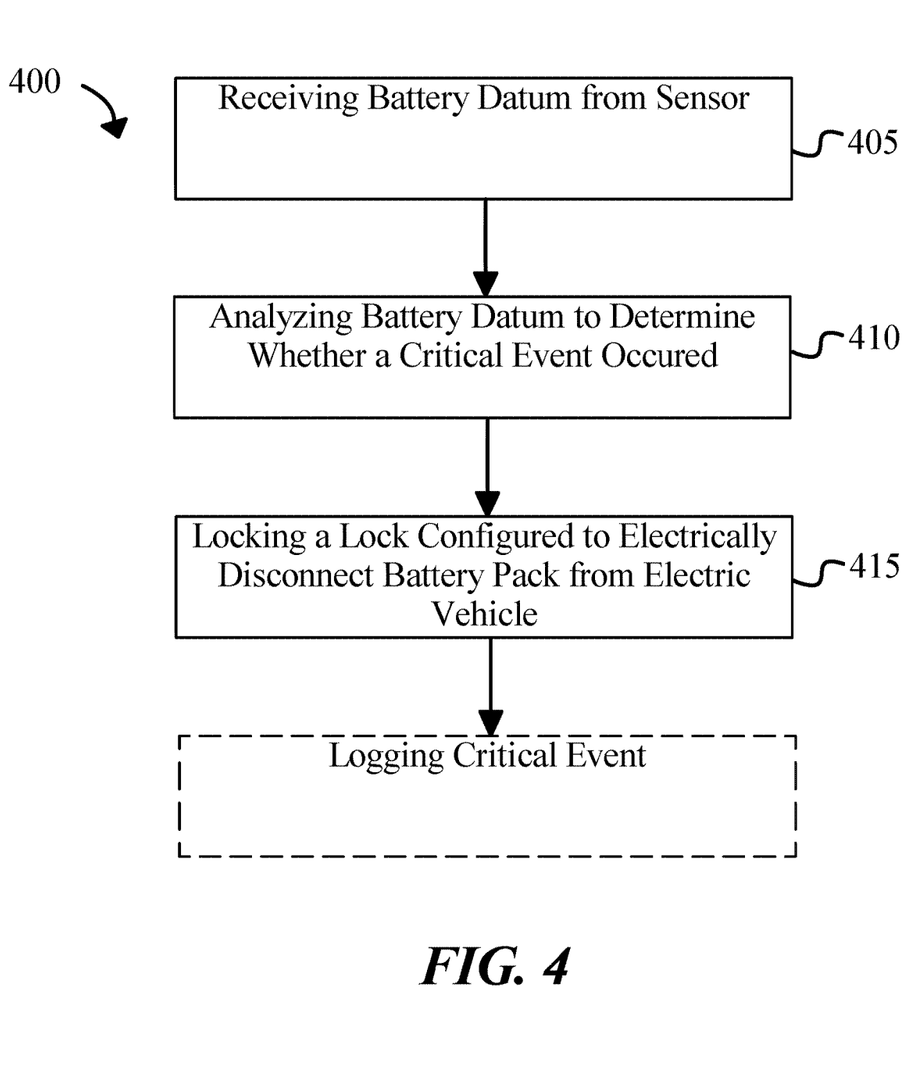
FIG. 4 is a flow chart of an exemplary embodiment of a method for locking a battery for an electric vehicle according to the present disclosure.

Referring now to FIG. 4, an exemplary embodiment of a method 400 for locking a battery for an electric vehicle is illustrated. At step 405, a controller, communicatively connected to a sensor configured to detect a critical event of a battery pack, receives battery datum from sensor; this may be implemented, without limitation, as described above in reference to FIGS. 1-4.

At step 410, and still referring to FIG. 4, controller analyzes battery datum to determine whether critical event has occurred; this may be implemented, without limitation, as described above in reference to FIGS. 1-4.

At step 415, with continued reference to FIG. 4, controller locks a lock attached to battery pack when controller determines critical event has occurred, wherein lock is configured to electrically disconnect battery pack from electric vehicle when locked, wherein lock is configured to only be unlocked manually. Lock may include a switch. Controller may be communicatively connected to an actuator configured to open switch. Lock may automatically lock when critical event occurs. Lock may be attached to a high voltage (HV) connection configured to electrically connect battery pack to electric vehicle. Battery pack may be inoperable when locked. Lock may be communicatively connected to a sensor configured to detect the critical event. Critical event may comprise battery pack overheating. Controller may be configured to log critical event in memory for a user to later view and understand the reason that lock locked. For example, if the critical event was overheating, controller may log with a timestamp that there was overheating and/or the temperature of battery pack when lock locked. Lock may comprise an indicator configured to visibly identify when lock is locked.

Figure 5:
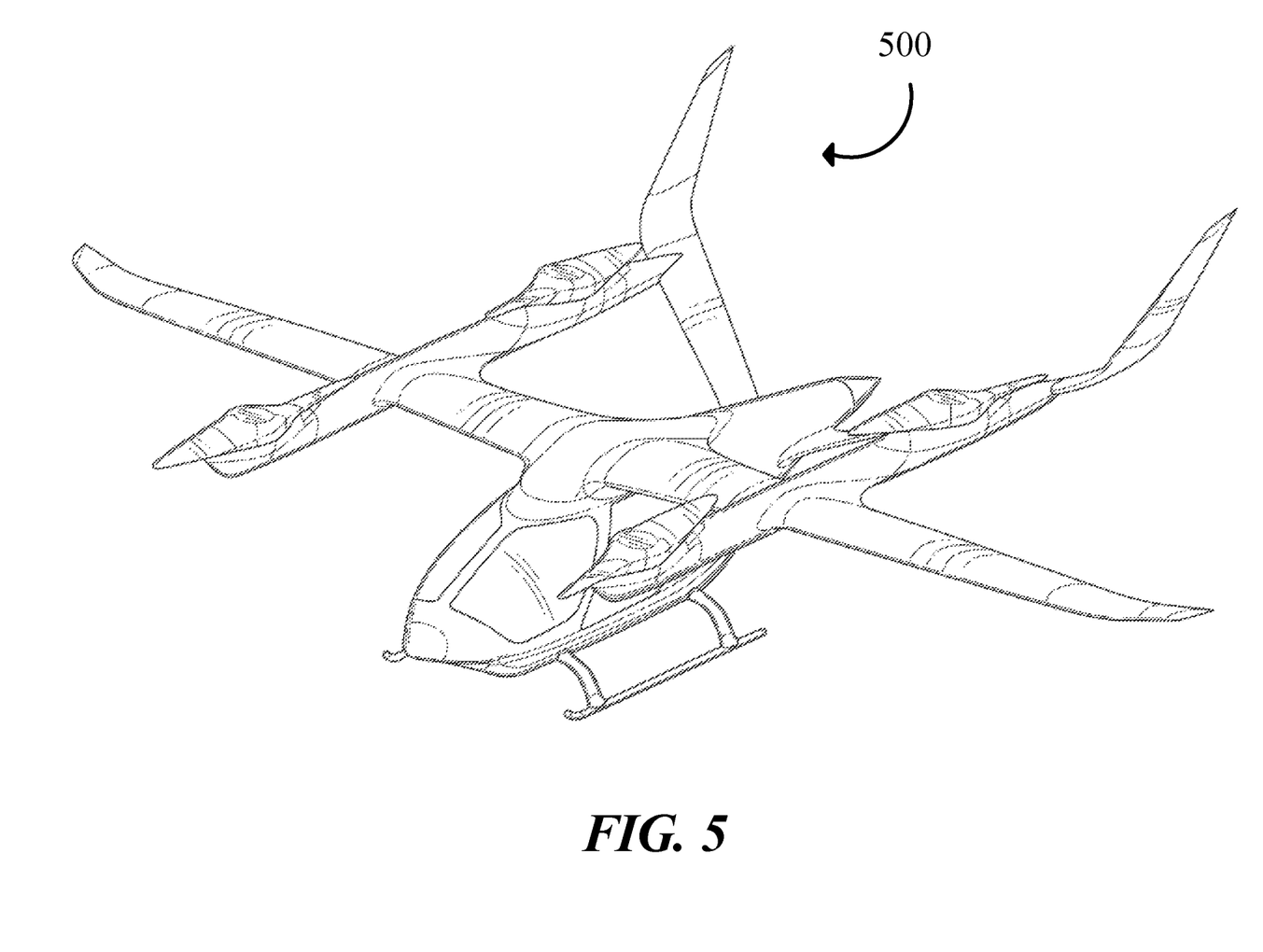
FIG. 5 is an illustration of an embodiment of an electric aircraft in one or more aspect of the present disclosure.

Referring now to FIG. 5, an embodiment of an electric aircraft 500 is presented in accordance with one or more embodiments of the present disclosure. Electric vehicle 108 may be electric aircraft 500. Electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
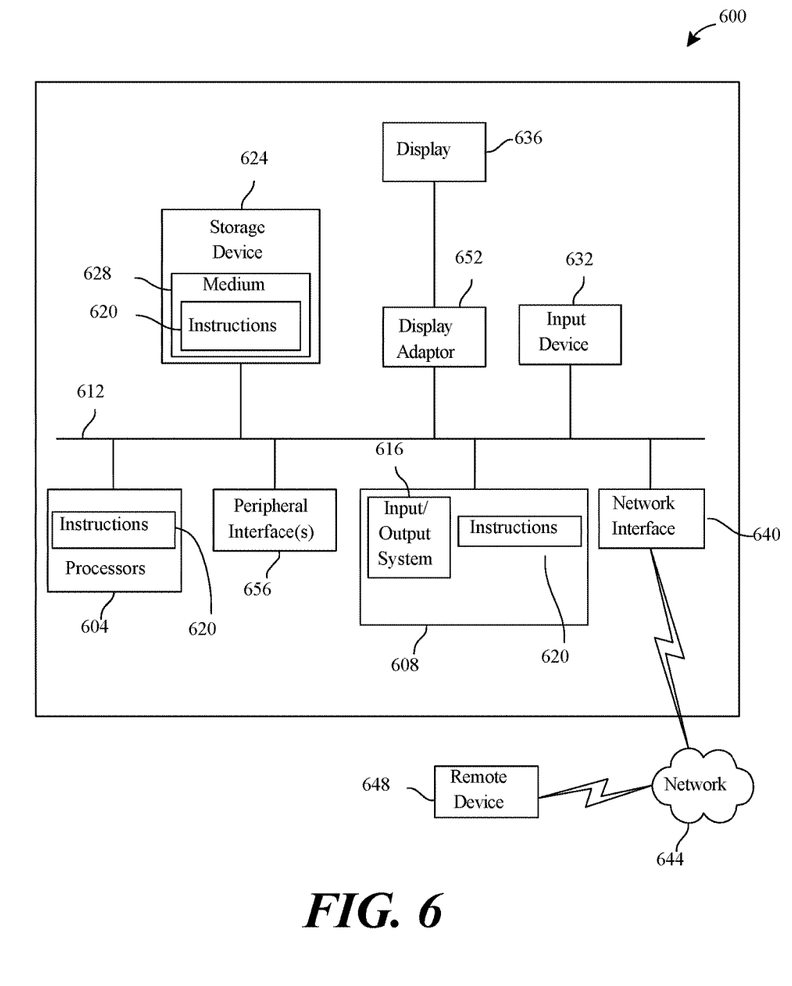
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for locking a battery for an electric aircraft, the system comprising:
    an electric aircraft comprising a battery pack, wherein a high voltage (HV) connection is configured to electrically connect to the electric aircraft and the battery pack;
    a lock attached to the battery pack and configured to electrically disconnect the battery pack from the electric aircraft when locked, wherein the lock is configured to only be unlocked manually by an acceptable user;
    a voltage sensor communicatively connected to the lock, wherein the voltage sensor is configured to detect a voltage associated with the battery pack; and
    an inertial measurement unit (IMU) communicatively connected to the lock, wherein the IMU is configured to detect a force experienced by the battery pack;
    a controller communicatively connected to the voltage sensor, the IMU, and the lock, the controller configured to:
        receive the voltage level from the voltage sensor and the force experienced by the battery pack from the IMU;
        analyze the voltage and the force experienced by the battery pack to determine whether a critical event has occurred; and
        lock the lock when the controller determines the critical event has occurred, wherein the lock is configured to electrically disconnect the battery pack from the electric aircraft when locked; and
        authorize a user to manually unlock the lock as a function of determination of the critical event, wherein authorization of a user comprises distinguishing the acceptable users from unacceptable users.

2. The system of claim 1, wherein the lock is electrically actuated.

3. The system of claim 1, wherein the lock automatically locks when a critical event occurs.

4. The system of claim 1, wherein the lock is attached to the HV connection.

5. The system of claim 1, wherein the battery pack is inoperable when locked.

6. The system of claim 1, wherein the critical event comprises the force experienced by the battery pack exceeding a threshold.

7. The system of claim 1, wherein the controller is configured to log the critical event.

8. The system of claim of claim 1, wherein the lock comprises an indicator configured to visibly identify when the lock is locked.

9. A method for locking a battery for an electric aircraft, the method comprising:
    electrically connecting, using a high voltage (HV) connection, an electric aircraft, and a battery pack;
    detecting, by a voltage sensor, a voltage associated with the battery pack;
    detecting, by an inertial measurement unit (IMU), a force experienced by the battery pack;
    receiving, at a controller communicatively connected to the voltage sensor and the IMU, the voltage associated with the battery pack from the voltage sensor and the force experienced by the battery pack from the IMU;
    analyzing, by the controller, the voltage associated with the battery pack and the force experienced by the battery pack to determine whether the critical event has occurred; and
    locking, by the controller, a lock attached to the battery pack when the controller determines the critical event has occurred, wherein the lock is configured to electrically disconnect the battery pack from the electric aircraft when locked, wherein the lock is configured to only be unlocked manually by an acceptable user; and
    authorizing, by the controller, a user to manually unlock the lock as a function of determination of the critical event, wherein authorization of a user comprises distinguishing the acceptable users from unacceptable users.

10. The method of claim 9, wherein the lock is electrically actuated.

11. The method of claim 10, wherein the controller is communicatively connected to an actuator configured to open the lock.

12. The method of claim 9, wherein the lock automatically locks when the critical event occurs.

13. The method of claim 9, wherein the lock is attached to a high voltage (HV) connection.

14. The method of claim 9, wherein the battery pack is inoperable when locked.

15. The method of claim 9, wherein the critical event comprises the force experienced by the battery pack exceeding a threshold.

16. The method of claim 9, wherein the controller is configured to log the critical event.

17. The method of claim of claim 9, wherein the lock comprises an indicator configured to visibly identify when the lock is locked.

* * * * *